United States Patent [19]

Iacovangelo

[11] Patent Number: 5,188,643
[45] Date of Patent: Feb. 23, 1993

[54] METHOD OF APPLYING METAL COATINGS ON CUBIC BORON NITRIDE AND ARTICLES MADE THEREFROM

[75] Inventor: Dominic C. Iacovangelo, Schenectady, N.Y.

[73] Assignee: General Electric Company, Schenectady, N.Y.

[21] Appl. No.: 738,758

[22] Filed: Aug. 1, 1991

[51] Int. Cl.$^5$ .............................................. B24D 3/00
[52] U.S. Cl. ..................................... 51/293; 51/295; 51/309
[58] Field of Search .................... 51/293, 295, 309; 204/14.1, 44.5

[56] References Cited

U.S. PATENT DOCUMENTS

| | | | |
|---|---|---|---|
| 3,762,895 | 10/1973 | Keeleric | 51/293 |
| 3,853,582 | 12/1974 | Labossier et al. | 117/22 |
| 4,381,227 | 4/1983 | Narcus | 204/16 |
| 4,399,167 | 8/1983 | Pipkin | 51/309 |
| 4,591,363 | 5/1986 | Silverman | 51/295 |

FOREIGN PATENT DOCUMENTS 60-75582 4/1985 Japan .
873629 5/1987 South Africa .

*Primary Examiner*—Mark L. Bell
*Assistant Examiner*—Willie J. Thompson
*Attorney, Agent, or Firm*—William H. Pittman

[57] ABSTRACT

A method of improving adhesion of a nickel alloy to the surfaces of cubic boron nitride particles and articles made therefrom. Cubic boron nitride particles are electrolessly nickel plated with the nickel alloy formed with the metalloid, such as boron. Electrolessly plated particles are then gradually heated at a steady rate from room temperature to a desired heat treatment temperature in a non-oxidizing atmosphere formed by argon containing 10% hydrogen. Exemplary articles made by the aforementioned process include a grinding wheel having uniformly dispersed abrasive cubic boron nitride particles having the Ni/B alloy coat thereon.

19 Claims, No Drawings

METHOD OF APPLYING METAL COATINGS ON CUBIC BORON NITRIDE AND ARTICLES MADE THEREFROM

FIELD OF THE INVENTION

The present invention is generally related to a method of applying metal coating on cubic boron nitride. More particularly, the invention relates to coating electroless metal alloys on cubic boron nitride.

BACKGROUND OF THE INVENTION

Cubic boron nitride is extremely hard having a Vickers hardness of about 5000. Its hardness makes cubic boron nitride useful in a variety of industrial components.

Abrasive particles, such as cubic boron nitride particles, have been extensively used for cutting, grinding, lapping and polishing in metal removing industries as well as in medical fields such as dentistry and surgery. Abrasive particles are used in abrasive tools such as grinding and dressing wheels, crowns and single point tools. Considerable amount of research has gone into improving the bonding properties of cubic boron nitride to the matrices of these tools since poor bonding at the cubic boron nitride/matrix interface leads to dislodgement of the cubic boron nitride particle from the matrix during the abrading operation. As a result of this research, it is known in the art that the metal coating of abrasive particles improves the retention of such particles in the matrices of various abrasive tools, such as resin bonded wheels. In particular it is known that the retention of cubic boron nitride particles is improved with nickel coating. To improve the retention of cubic boron nitride particles, their surfaces are provided with a rough textured nickel coat having jagged edges. The jagged edges provide the metal coated particles improved mechanical interlocking means with which to retain them in the resin matrix during the abrading operation. The metal coat also provides means for evenly transfering heat generated along the surfaces of the abrasive particles during the abrading action. However metal layers have poor adhesion to cubic boron nitride.

It is also known in the art that the retention of cubic boron nitrides in the abrasive tools is further improved by providing the particles with multiple layers of metals, such as molybdenum, titanium, niobium, chromium, zirconium, copper and nickel.

The metal coating of the particles may be achieved by a variety of methods depending on the nature of the metal coating. The metal coating may be applied under high temperature, by well known processes, such as chemical vapor deposition, molten salt deposition and powder agglomeration coating. The main drawback of such techniques is that the high process temperatures can significantly degrade the abrasive particles. The aforementioned problem of degradation may be somewhat obviated by electrolytically, electrolessly or vacuum depositing the metal coating on abrasive particles, however the problem of poor adhesion to cubic boron nitride still remains.

The present invention is directed to improving adhesion of metal coats to the surfaces of cubic boron nitride particles.

STATEMENT OF THE INVENTION

The present invention is directed to a method of improving adhesion of a nickel alloy coat to a surface of a cubic boron nitride article comprising the steps of contacting said article for an effective time with an electroless plating bath for plating said surface of said article to a desired thickness, said bath comprising a compound of nickel and a compound of an element selected from the group consisting of boron, molybdenum, titanium, niobium and chromium, gradually heating the electrolessly plated article in a non-oxidizing atmosphere from a first temperature to a desired heat treatment temperature at a predetermined rate, and maintaining the electrolessly plated article at the desired heat treatment temperature until a desired degree of adhesion between the surface and the metal alloy coat is attained.

Typically a nickel/boron alloy coat is applied by the aforementioned method to cubic boron nitride particles. Said particles are then uniformly dispersed and embedded in a resinous matrix of a grinding wheel to improve its abrasion efficiency.

Other advantages of the invention will become apparent upon reading the following detailed description and appended claims.

DETAILED DESCRIPTION OF THE PREFERRED EMBODIMENT

The present invention is directed to improving adhesion of metal coatings on cubic boron nitride surfaces. The cubic boron nitride surfaces are electrolessly plated with a nickel alloy containing a metalloid, such as boron, or a transition metal, such as molybdenum, titanium, niobium or chromium, to improve the wettability of the cubic boron nitride surfaces as well as improve formation of a chemical bond between the nickel alloy and cubic boron nitride.

Generally an adhesive bond between the metal layer and the surface of the underlying substrate is established by interfacial molecular contact between the metal layer and the surface. The interfacial molecular contact is proportional to the wettability of the surface. The wettability of the surface is defined in terms of the angle of contact of a liquid droplet on a surface. A wettable surface will have acute angle (less than 90°) of contact whereas a non-wettable surface will have obtuse angle (more than 90°) of contact.

The steps of the invention provide for chemically modifying a surface of an article of cubic boron nitride, such as cubic boron nitride particles, for improving adhesion of a metal layer thereon. In one of its embodiments, the process of this invention provides for sequentially contacting the surface with the solutions disclosed hereinafter.

The cubic boron nitride surface is catalytically activated to permit electroless metal deposition. The catalytically activated surface is then electrolessly plated with a metal layer of a desired thickness. In subsequent steps the electrolessly plated surface may be electrolytically plated (electroplated) or electrolessly plated with another layer of a metal similar to the one underneath or a different one. The steps are normally interposed with rinsing steps.

The term "surface" or "cubic boron nitride surface" means a surface of a cubic boron nitride substrate used in an article such as abrasive particles embedded in a grinding wheel. Typically the abrasive particles made from cubic boron nitride have a mesh size between 320 and 30. However it is apparent to those skilled in the art that the present invention is also suitable for mesh sizes bigger or smaller than those mentioned above.

If necessary the cubic boron nitride surface may be initially degreased with a degreasing agent such as a detergent, a suitable organic solvent or a dilute acid. Typical surface cleaners suitable for the cubic boron nitride surface are solvents such as Freon ® TF 1,1,2-trichlorotrifluoroethane, dilute nitric acid or dilute hydrochloric acid. However environmentally safe cleaners such as Shipley Acid Cleaner 1118, Micro manufactured by International Products Inc., Trenton, N.J., or alcoholic solutions of amines such as SP-734 manufactured by Chemical Solvents Inc., Cleveland, Ohio are often preferred.

As used hereinafter, the term "degreased" means a cubic boron nitride substrate having its surface free of oil, finger prints or extraneous material.

As used hereinafter "effective time, temperature and concentration" relate to a period of duration, degree of temperature and concentration respectively required to achieve a sufficient level of the metal deposition necessary to produce a desired result on the surface and those skilled in the art will readily realize that by manipulating the concentrations and the temperatures of the various aforementioned reagents used in the present invention, the time of contact may be optimized for particular processing conditions.

It is often useful to begin the activation of the surface by treatment with an additive which aids in absorption of the plating catalyst. Such additives are well-known in the art. Exemplary aids to catalyst absorption include Shipley Cuposit ® 1175A Cleaner-Conditioner, a mix of ethanolamine and triethanolamine manufactured by the Shipley Company, and Metex ® 9420, a product of the MacDermid Corporation.

Immersion in about 0.1% to about 5% by volume of either of these agents in water for about 1 minute to about 10 minutes at a temperature of from about 40° C. to about 80° C. is usually sufficient. Preferably a Shipley Cuposit ® 1175A bath maintained at about 55° C. and having a concentration level recommended by the manufacturer, of about 2.5% by volume, is used.

Activation of the surface for plating purposes can be achieved by well known methods of the art. For example, the substrate may be contacted with an acid solution of a precious metal, such as palladium chloride in hydrochloric acid, for a period of time sufficient to cause catalytic activation of the surface.

One illustrative activation technique involves immersing the surface in a solution of MacDermid ® D34C Pd, a product of the MacDermid Corporation. This solution provides a palladium/tin plating catalyst. A water rinse generally follows the activation step.

After surface activation and rinsing, electroless plating of a nickel alloy coat can be undertaken. A preferred electroless bath of the invention is an aqueous solution comprising a nickel salt, a chelating agent, a reducing agent and a pH adjuster. The nickel salt, such as nickel sulfate, nickel acetate or nickel halide may be used as a source of nickel ions. Nickel sulfate is preferred. In general, the nickel salt should be added in an amount ranging from about 0.01M to about 0.2M, preferably about 0.112M to about 0.116M, and most preferably about 0.114M. A chelating agent, such as malic acid, acetic acid, lactic acid or citric acid, may be used. Malic acid is preferred. In general, the chelating agent should be added in an amount ranging from about 0.03M to about 0.6M, preferably about 0.325M to about 0.348M, and most preferably about 0.337M. The reducing agent, such as dimethylamine borane, alkali metal borohydride or trimethylamine borane, may be used as a source for boron ions. Dimethylamine borane is preferred. In general, the reducing agent should be added in an amount ranging from about 0.005M to about 0.1M, preferably about 0.04M to about 0.08M, and most preferably about 0.06M. A pH adjuster, such as ammonium hydroxide or alkali metal hydroxide, may be used for increasing the pH of the electroless bath. Ammonium hydroxide is preferred. In general, the pH adjuster should be added to maintain the pH from about 4 to about 6, preferably about 5.5.

Another electroless bath suitable for the present invention comprises a conventional electroless nickel/phosphorus plating bath, such as AK 1000 ® sold by Allied Kelite Corporation, mixed with a compound of a transitional element. The pH of the bath is adjusted from about 9 to about 10, preferably to about 9.5, by adding an alkali metal hydroxide. NaOH is preferred. Illustrative nickel alloys used to form the metal coat include elements, such as molybdenum, tungsten, titanium, niobium or chromium. Molybdenum is preferred. In general, the compound of the transitional element is added to the conventional nickel/phosphorus bath, such as AK 1000 ®, at a concentration of about 0.001M to about 0.100M, preferably at a concentration of about 0.01M to about 0.02M. Sodium molybdate is preferred.

Electroless baths are well-known in the art and are generally described in the *Kirk-Othmer Encyclopedia of Chemical Technology*, 3rd Edition, Volume 8, the contents of which are incorporated herein by reference.

The selection of a particular bath or electroless plating process is not critical to the present invention. The contents of the bath and the particular plating parameters, e.g., temperature, pH, and immersion time, will of course depend on the particular metal alloy being deposited thereon. Immersion times, bath temperatures, and other operating parameters can be determined and controlled according to manufacturers' suggestions. Typically the bath may be agitated by ultrasonic or stirring means during the plating of the cubic boron nitride particles to prevent bridging between the individual particles. A fluidized bed may be also employed to prevent the aforementioned bridging action. Those having ordinary skill in the plating art will be able to determine the most appropriate plating procedure for a particular situation.

The metal coated cubic boron nitride surface is then subjected to a heat treatment after electroless deposition of the metal alloy. During the heat treatment the temperature is gradually increased at a steady predetermined rate from a first temperature to a heat treatment temperature for preventing balling of the metal layer. The term "balling" is defined as a delamination of a metal coat from an underlying surface wherein the metal coat curls away from the surface to form a ball-like shape. The temperature is raised at the rate of less than 20° C. per minute, preferably at the rate of about 10° C. per minute. The first temperature is typically room temperature of about 24° C. The heat treatment is conducted in a non-oxidizing atmosphere containing an inert gas mixed with about 5% to about 10% by volume of hydrogen. The inert gas may be selected from the noble gases of Group XVIII of the periodic chart. Argon is preferred. Oven heating of the entire article, i.e., substrate with metal thereon, is sufficient, although any heating method is suitable. Typically, this heat treatment is carried out at a heat treatment temperature ranging from about 400° C. to about 900° C., preferably at about 500° C. to about 700° C., for about 25 minutes to about 120 minutes, with higher temperatures within the above range generally compensating for shorter duration, and vice versa. The preferred duration for the aforementioned heat treatment is about one hour. Although the mechanism is not fully understood, the heat treatment appears to improve formation of the chemical bond between the cubic boron nitride surface and the metal layer.

If another layer of metal is to be applied on the electrolessly metal coated surface, e.g., by electroplating, the above-described heat treatment can in some instances be omitted if the aforementioned heat treatment is employed after the final plating step, as described below. However, preferred embodiments include the heat treatment prior to deposition of the additional metal layers.

Though electroless plating is the preferred application method for the second metal layer, electroplating may be also used. The substrate is usually cleaned prior to immersion in the electroplating bath. The cleaning can be performed by rinsing the substrate with a dilute solution of a strong acid, such as 10% by volume hydrochloric acid in water.

Electroplating baths are well-known in the art and are described, for example, in U.S. Pat. No. 4,555,315, incorporated herein by reference, although the particular electroplating bath used is not critical to the present invention. The choice of course depends in part on the particular metal being deposited. Suitable metals include nickel, copper, cobalt, palladium, and platinum. Furthermore, those skilled in the art appreciate that the particular bath contents will depend upon some of the factors considered for the electroless deposition of metal described above. A description of baths for plating copper or various other metals is given in the *Kirk-Othmer* reference described above, in Vol. 8, beginning on page 826. Baths used to apply a layer typically include an aqueous acidic copper electrolyte such as those of the acidic copper sulfate or acidic copper fluoroborate type; halide ions, such as chloride and/or bromide ions; and various other components well known in the art. The thickness of this second metal layer will of course depend upon the desired end use of the metal-coated substrate.

An etching agent is often used prior to the deposition of this second electrolytic layer. A typical example of the etching agent is a dilute solution of a strong acid, such as hydrochloric acid in water at a concentration of 50% by volume. The substrate is immersed in the aforementioned etching agent for about 10 seconds to about 120 seconds. A deionized water rinse step usually follows the etching step. The substrate is now ready for further plating. The electrolytic bath for the second electrolytic layer can be one of the conventional baths known in the art.

After deposition of the second electrolytic layer, the surface is rinsed again with water and may be provided with a second heat treatment for further enhancing adhesion of the metal layers to the substrate. A typical heat treatment for this step involves temperatures ranging from about 100° C. to about 500° C. for a time period ranging from about 5 minutes to about 20 hours.

In the preferred embodiments, an article prepared by the method of this invention usually has a first electrolessly applied metal coat of about 0.25 micron to about 3 microns thickness; a second electrolessly applied metal layer of about 5 microns; and a third, if so desired, electrolessly applied metal layer of about 5 microns thickness. However it should be noted that the present invention contemplates multiple layers of different metals and it should not be construed that the invention is restricted to just three or less metal layers or to specific metal layers disclosed herein.

An article prepared by the method of this invention comprises a cubic boron nitride surface having a metal alloy layer, such as a nickel alloy layer, thereon. The metal is alloyed with a metalloid, such as boron or a transitional metal, such as molybdenum, tungsten, titanium, niobium or chromium. The metal alloy layer comprises an electrolessly applied first metal coat on the cubic boron nitride surface. Additional secondary metal layers may be electrolessly or electrolytically applied on top of the first metal coat until a desired thickness is attained. The present invention contemplates various combinations of metal alloy layers such as a single nickel/boron alloy layer, a primary nickel/boron alloy layer followed by a secondary nickel/phosphorus layer or a primary nickel/boron alloy layer followed by a secondary copper layer and a tertiary cobalt layer.

An article of manufacture of the preferred embodiment is an article such as metal alloy coated cubic boron nitride abrasive particles embedded in a resinous matrix of an abrasive tool, such as a grinding wheel, having particle surfaces electrolessly metal coated with a first nickel/boron alloy coat thereon by the process of the present invention. A second metal layer preferably of nickel/phosphorus may be disposed on top of the first metal coat, the second layer being electrolessly or electrolytically applied on the first layer. As stated earlier, the second layer is preferably deposited by electroless metal deposition. The combined thickness of the metal layers is adjusted to a desired thickness sufficient to withstand the abrading action.

Another example of an article of manufacture disclosed in the present invention is an abrasive tool, such as an end mill, having an abrasive surface provided by a metal alloy coated cubic boron nitride film, typically a dics. The surface of the film is provided with an electrolessly plated nickel/boron alloy coat. A second metal layer preferably of nickel/phosphorus may be disposed on top of the first metal coat, the second layer being electrolessly or electrolytically applied on the first layer. By providing the cubic boron nitride film with such a metal alloy coat, its degree of adhesion to another metal surface, such as the one provided by a tool holder, is improved significantly.

The present invention will be further understood from the illustration of specific examples which follow.

EXAMPLE 1

A 200 milliliter aqueous solution of Ni/B electroless bath was made by mixing 0.114M nickel sulfate, 0.337M malic acid and 0.06M dimethylamine borane. The pH of the bath was adjusted to 5.5 by using NH$_4$OH. The bath was maintained at 85° C. during plating.

Several one inch diameter discs prepared from a polycrystalline cubic boron nitride film were first activated by placing them in a solution of MacDermid ® D34C Pd for 4 minutes at 25° C., followed by washing in deionized water and then by drying in air.

Some of the cubic boron nitride discs were then placed in the plating bath. Plating time was 10 minutes.

A Ni/B coat of 1.0 micrometer thick was deposited on the discs. The discs were then gradually heated in a non-oxidizing atmosphere of 7% Hydrogen 93% Argon at a rate of 10° C./minute to various heat treatment temperatures, shown in Table 1 below. The heat treatment was conducted for 1 hour.

The adhesion was measured with a Sebastian Model I adhesion tester, sold by Quad Group, Santa Barbara, Calif. The adhesion tester measures the force in pounds per square inch (psi) required to pull a standardized epoxy coated pin off the test surface. The standardized epoxy coated pin is sold by Quad Group, Spokane, Washington. The epoxy surface of the pin was held against the test surface and then heated according to the standard test procedure to allow the epoxy to set to a standard adhesion level. The standard procedure specifies heating the pin with a test sample attached thereto for one hour at 150° C. The adhesion forces required to separate the Ni/B coating from the pin are tabulated in Table 1.

TABLE 1

| Adhesion of Ni/B to CBN | |
|---|---|
| Heat Treat Temperature (°C.) | Adhesion (psi) |
| 500 | 250 |
| 550 | 1340 |
| 600 | 7000 |
| 600 | 8090 |
| 600 | 190 |
| 600 | 3830 |
| 625 | 50 |
| 625 | 7280 |
| 625 | 1390 |
| 650 | 500 |
| 650 | 210 |
| 650 | 750 |
| 700 | 50 |

The Ni/B layer on the disc, when examined under scanning electron microscopy, showed a smooth well wetted surface. The Ni/B coating was leached off the cubic boron nitride substrate and analyzed by atomic absorption spectroscopy to determine its composition. The Ni/Mo coating was found to have a composition of 4% B, 96% Ni.

For comparison, one of the aforementioned cubic boron nitride discs was nickel coated by a conventional AK1000 ® Ni/P bath without addition of boron. This coating showed complete balling of the nickel coat from the cubic boron nitride surface after the heat treatment and under the aforementioned adhesion test, this coating separated from the cubic boron nitride surface of the disc at less than 100 psi. Therefore, it is apparent that by alloying nickel with boron, by the method of the present invention, an unexpectedly significant improvement in adhesion of the nickel coat to the cubic boron nitride is achieved.

EXAMPLE 2

A 20 gram batch of 170/200 mesh size Borazon ® cubic boron nitride powder, sold by DE Superabrasives, Worthington, Ohio was suspended in MacDermid ® D34C Pd catalyst for 4 minutes at 25° C., and then rinsed in deionized water and air dried. The cubic boron nitride particles were placed in 1500 ml of the Ni/B bath described in example 1. The cubic boron nitride powder was rinsed in deionized water after electroless plating by the Ni/B bath and then filtered and air dried. The electrolessly plated cubic boron nitride powder was then heat treated for one hour in 7% Hydrogen 93% Argon. The heat was gradually increased at a steady rate of 10° C./minute to 600° C. The heat treated cubic boron nitride powder was then examined under scanning electron microscopy. The examination showed cubic boron nitride powder particles having a uniform well wetted coat. The Ni/B coating was stripped off the cubic boron nitride powder in a conventional acid bath and then analyzed by atomic absorption spectroscopy for its composition. The Ni/B composition was identical to the one in example 1. The thickness of Ni/B coat was calculated from the weight gain, assuming uniform coverage. It was determined to be 0.9 micrometers. The Ni/B coated cubic boron nitride particles were then electrolessly plated with a second layer in AK1000 ® Ni/P bath for a time sufficient to obtain 56% by weight of nickel. This cubic boron nitride powder was then used in an abrasive grinding wheel. The particles of the cubic boron nitride powder showed good adhesion to the Ni/B bond coat and Ni/P overcoat.

EXAMPLE 3

A 200 milliliter solution of Ni/Mo electroless bath was made by adding 0.015M sodium molybdate to a standard electroless AK1000 ® Ni/P bath. The pH of the bath was adjusted to 9 by using NaOH. The bath was maintained at 85° C. during plating. An activated cubic boron nitride disc, activated by the steps described in Example 1, was then placed in the plating bath. Plating time was 20 minutes.

The Ni/Mo coat on the cubic boron nitride disc was 2.0 micrometers thick. The disc sample was gradually heated in a non-oxidizing atmosphere of 7% Hydrogen 93% Argon at a rate of 10° C./minute to 900° C. and then heat treated for 1 hour.

The adhesion was measured with the Sebastian Model I adhesion tester described in Example 1. The adhesion force required to separate the Ni/Mo coating from the pin was in excess of 3700 psi. The coating was leached off the cubic boron nitride substrate and analyzed by atomic absorption spectroscopy to determine its composition. The Ni/Mo coating was found to have a composition of 15.8% Mo, 83.4% Ni, 0.8% P.

For comparison, one of the aforementioned cubic boron nitride discs was nickel coated by a conventional AK1000 ® Ni/P bath without addition of Mo. This coating showed complete balling of the nickel coat from the cubic boron nitride surface after the heat treatment and under the aforementioned adhesion test, this coating separated from the cubic boron nitride surface of the disc at less than 100 psi. Therefore, it is apparent that by alloying nickel with Mo, by the method of the present invention, an unexpectedly significant improvement in adhesion of the nickel coat to the cubic boron nitride is achieved.

What is claimed is:

1. A method of improving adhesion of a metal alloy coat to a surface of a cubic boron nitride article comprising the steps of:
   contacting said article for an effective time with an electroless plating bath for plating said surface of said article to a desired thickness, said bath comprising a compound of said metal and a compound of an element selected from the group consisting of boron, molybdenum, titanium, niobium and chromium;
   gradually heating said electrolessly plated article in a non-oxidizing atmosphere from a first temperature to a desired heat treatment temperature of about 400° C. to about 900° C. at a rate of less than about 20° C. per minute; and maintaining said electrolessly plated article at said desired heat treatment temperature until a desired degree of adhesion between said surface and said metal alloy coat is attained.

2. The method according to claim 1 wherein said metal alloy is nickel alloyed with boron.

3. The method according to claim 1 further comprising depositing an electrolessly applied or electrolytically applied second metal layer on top of said metal alloy coat.

4. The method according to claim 3 which further comprises providing said article with a second heat treatment at about 100° C. to about 500° C. for about 5 minutes to about 20 hours.

5. The method according to claim 1 wherein said bath is maintained at a pH of about 5.0 to about 10.0.

6. The method according to claim 1 wherein said compound of said element is dimethylamine borane at a concentration of about 0.005M to about 0.1M.

7. The method according to claim 1 wherein said first temperature is room temperature.

8. The method according to claim 1 wherein said desired heat treatment temperature is about 400° C. to about 900° C.

9. The method according to claim 1 wherein said article is gradually heated at a rate of about 10° C. per minute.

10. The method according to claim 1 wherein said cubic boron nitride article is a grinding wheel which comprises uniformly dispersed and embedded abrasive cubic boron nitride particles in a resinous matrix, said particles having said metal coat thereon.

11. A method of improving adhesion of a nickel alloy coat of desired thickness to surfaces of cubic boron nitride particles comprising the steps of:

contacting said particles for an effective time with an electroless plating bath, said bath further comprising a compound of said nickel and a compound of an element selected from the group consisting of boron, molybdenum, titanium, niobium and chromium, for plating said surfaces of said particles with said nickel alloy coat;

gradually heating said electrolessly plated particles in a non-oxidizing atmosphere from a first temperature to a desired heat treatment temperature of about 400° C. to about 900° C. at a rate of less than about 20° C. per minute; and maintaining said electrolessly plated particles at said desired heat treatment temperature until a desired degree of adhesion between said surfaces and said nickel alloy coat is attained.

12. The method according to claim 11 wherein said bath is agitated during said plating of said surfaces to prevent bridging of said particles.

13. The method according to claim 12 wherein said bath contains dimethylamine borane at a concentration of about 0.04M to about 0.08M.

14. The method according to claim 12 wherein said electrolessly plated particles are further provided with a second layer of electrolessly applied nickel phosphorus alloy.

15. An improved abrasive tool comprising cubic boron nitride particles uniformly dispersed and embedded in a resinous matrix wherein surfaces of said particles have an electrolessly applied nickel alloy coat thereon, said nickel alloy coat comprising nickel alloyed with an element selected from the group consisting of boron, molybdenum, titanium, niobium and chromium, and wherein said nickel alloy coat is further subjected to gradual heating in a non-oxidizing atmosphere from a first temperature to a desired heat treatment temperature of about 400° C. to about 900° C. at a rate of less than about 20° C. per minute, said particles then heat treated at said heat treatment temperature for improving adhesion between said surfaces of said cubic boron nitride particles and said matrix.

16. The abrasive tool according to claim 15 further comprising an electrolessly applied nickel phosphorus alloy layer disposed on top of said nickel alloy coat.

17. The abrasive tool according to claim 15 wherein said tool is a grinding wheel.

18. An article prepared by the method of claim 1 which is a grinding wheel.

19. The method of claim 11 further comprising uniformly dispersing and embedding said particles in a resinous matrix to form an abrasive tool.

* * * * *